J. BURGER.
RAKE.
APPLICATION FILED MAR. 23, 1909.
946,653.
Patented Jan. 18, 1910.
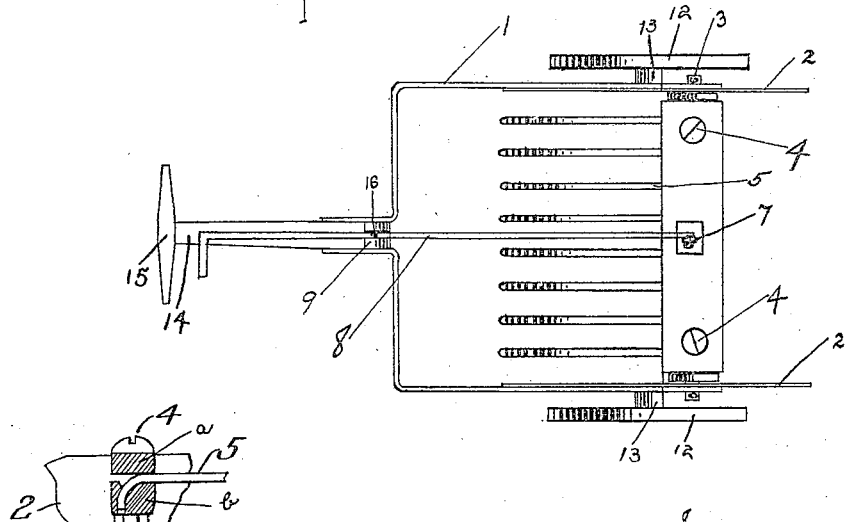
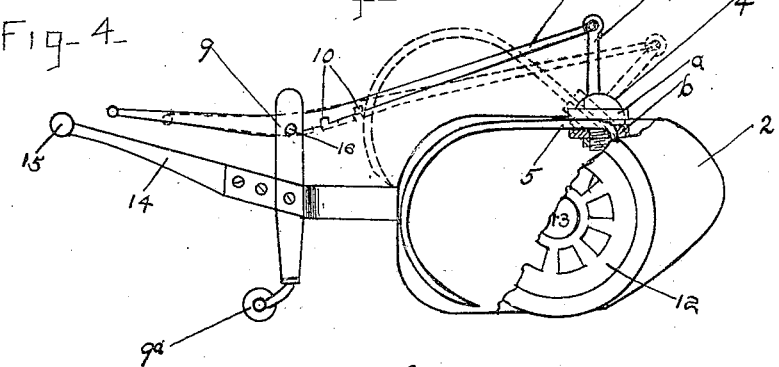
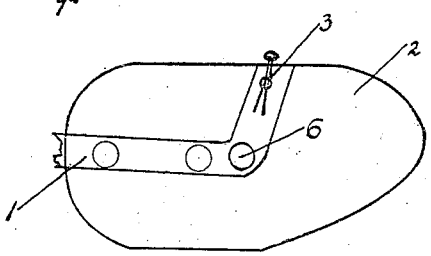
Inventor
Joseph Burger
Witnesses
J. F. C. Deeds.
G. E. Small.
By D. Swift &c.
Attorneys
ANDREW B. GRAHAM CO., PHOTO-LITHOGRAPHERS, WASHINGTON, D. C.

UNITED STATES PATENT OFFICE.

JOSEPH BURGER, OF PITTSBURG, KANSAS.

RAKE.

946,653.  Specification of Letters Patent.  Patented Jan. 18, 1910.

Application filed March 23, 1909. Serial No. 485,241.

*To all whom it may concern:*

Be it known that I, JOSEPH BURGER, a citizen of the United States, residing at Pittsburg, in the county of Crawford and State of Kansas, have invented a new and useful Rake; and I do hereby declare the following to be a full, clear, and exact description of the invention, such as will enable others skilled in the art to which it appertains to make and use the same.

The invention relates to improvements in rakes, and has for its object to provide a simple, inexpensive and durable device of this character adapted for the use of raking grass or leaves, or any other light stuff.

In the drawings, Figure 1 is a plan view of a rake constructed according to this invention. Fig. 2 is a side elevation of the same partly in section, the act of dumping the hay, being shown in dotted lines. Fig. 3 is a plan view of one of the wings. Fig. 4 is an enlarged sectional view through the members $a$ and $b$.

Referring to the drawings, 1 designates a U-shaped frame which is connected with a pair of side wings 2. In the upper portions of these wings, are mounted the clamping members $a$ and $b$, as at 3, which members are clamped together by means of screws 4. Between the members $a$ and $b$ the fingers or teeth 5 of the rake are mounted. The device is provided with stub axles which are mounted in apertures 6 of the wings as shown in Fig. 3. Rigidly connected with the clamping members is a vertical arm 7 to which is pivotally connected an operating member 8. The member 8 has one end mounted in a slot in the upper end of a post 9. The post 9 is provided with a catch 16 which engages notches 10 in said member for the purpose of holding the teeth or fingers in an operative or inoperative position, as desired. When the fingers 5 have gathered enough grass, the same can be readily dumped by moving the member 8 forward, as shown in dotted lines in Fig. 2 of the drawings. The post 9 is provided with a roller $9^a$.

The rake is supported by wheels 12 which are mounted on stub axles 13. The rake is operated by a rearwardly projecting handle 14 having a cross-piece 15 adapted to be gripped by the operator.

What is claimed is: —

1. In a device of the class described, a U-shaped frame, a pair of wings carried by said frame, a stub axle connected with each wing and with said frame, wheels carried by said axles, and rake teeth pivotally mounted in said frame.

2. In a rake, a U-shaped frame, a wing rigidly connected with each side of said frame, stub axles piercing each wing and frame, clamping members also mounted in said wings, rake teeth carried by said clamping members, said frame being provided with a rear post having a slot in the upper end thereof, a catch mounted in said slot, said clamping members being provided with an upwardly extending arm, a rod or member connected with said arm and adapted to turn said clamping members on a pivot, said rod or member being provided with notches adapted to be engaged by said catch.

3. A device of the class described comprising a frame, a pair of teeth-carrying clamping members mounted in said frame, a slotted post also mounted in said frame, a notched rod adapted to engage said slot for operating said clamping members when it is desired to dump the contents of the rake and a catch mounted in said slot and adapted to be engaged by the notches in said rod.

In testimony whereof I have signed my name to this specification in the presence of two subscribing witnesses.

JOSEPH BURGER.

Witnesses:
 A. O. FRANKS,
 W. H. DE LANG.